INTERLOCKING GRATING AND FRAMING SYSTEM FOR TRENCH DRAINS

Original Filed April 17, 1961 2 Sheets-Sheet 1

INVENTOR.
GEORGE J. FLEGEL
BY Ely + Golrick
ATTORNEYS

INTERLOCKING GRATING AND FRAMING SYSTEM FOR TRENCH DRAINS

Original Filed April 17, 1961 2 Sheets-Sheet 2

INVENTOR.
GEORGE J. FLEGEL
BY Ely & Gobrick
ATTORNEYS

United States Patent Office

Re. 26,366
Reissued Apr. 9, 1968

26,366

INTERLOCKING GRATING AND FRAMING SYSTEM FOR TRENCH DRAINS

George J. Flegel, Michigan City, Ind., assignor, by mesne assignments, to JOSAM Manufacturing Co., Michigan City, Ind., a corporation of Delaware Original No. 3,221,616, dated Dec. 7, 1965, Ser. No. 103,310, Apr. 17, 1961. Application for reissue Apr. 7, 1967, Ser. No. 637,019

13 Claims. (Cl. 94—34)

Matter enclosed in heavy brackets [ ] appears in the original patent but forms no part of this reissue specification; matter printed in italics indicates the additions made by reissue.

*ABSTRACT OF THE DISCLOSURE*

*In a poured concrete trench drain, flush framing elements longitudinally rabbeted to receive flush, abutting, metal or plastic trench-covering members upwardly displaying a straight line of abutment, each supported by opposite ends on the rabbet shoulders, including like grate-type members covering the major trench area and having downwardly spaced lateral lugs and lug receiving recesses cooperatively engaged with recesses and lugs of adjacent members and each having on at least one end an integral projection engaged in a frame element rabbet side-wall groove; and locking members having groove engaged-projections on both ends and lateral recesses, disclosed in two types—a narrow filler bar type, and a grate-type with a screw-secured key plate projecting from a recess at the end opposite an integral tongue projection location; rectangular- and sector-shaped grate members being disclosed.*

The present invention is concerned generally with trench drain framing and grating; and more particularly with an interlocking system of framing and grating for a drain trench.

Trench drains have been used in environments as diverse as water level deck swimming pools, streets, floor areas in buildings where water is used for various operations. For such drains the prior art has long known the use of metal framing elements anchored in a surrounding matrix such as poured concrete or other structure in which the trench is formed and supporting at opposite ends each of a series of grating members in contiguous relation, usually at the level of the adjacent drained area, as a top closure for the drain trench.

The present invention is concerned with the provision of framing elements embedded or anchored generally as known to the prior art in the edges of the drainage trench in combination with grating members supported in an interlocking relation of framing elements with respect to grating members and adjacent grating members with each other. Further the present invention provides framing and grating members for a drainage trench especially adapted for use with grating members formed of synthetic plastic whereby the grating members are readily locked in position to prevent casual removal thereof, for example, by patrons of a swimming pool or the like. Specifically the present invention provides, in straight drainage trench sections, framing elements and grate members which in a given section result in an interlocked engagement of a series of successive and contiguous grating members with each other and with framing elements supporting the same endwise, with the grate members being of such identity in general form that the same basic mold may be used for fabrication.

An object of the present invention is the provision of framing elements and grating members in a trench drain system adapted to an interlocking relation of the grating members with each other and with the frame elements preventing casual removal without the use of specific tools.

Another object is the provision of a grating and framing system for a drainage trench particularly adapted for use of molded plastic grating members by inclusion of means for interlocking adjacent grating members with each other and with framing elements preventing ready removal of the grating members and consequent damage thereto.

Other objects and advantages of the present invention will appear from the following description and the drawing wherein.

Figure 8:
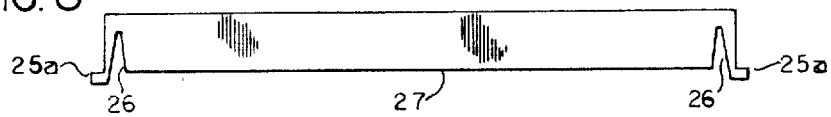

FIG. 8 *is a detail of a filler bar locking member.*

Figure 1:
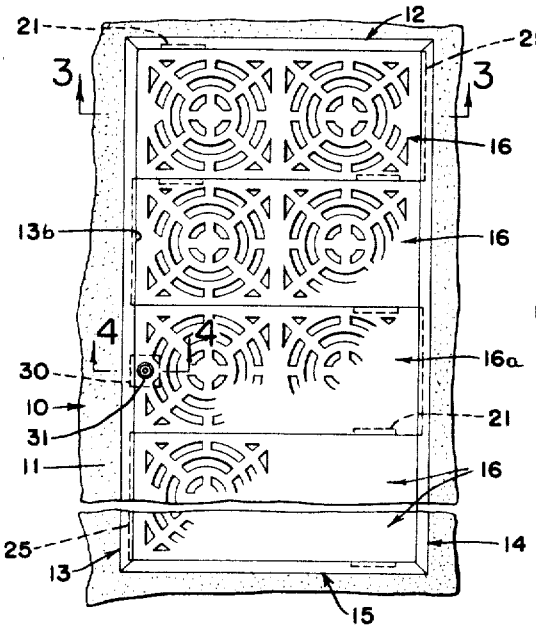
FIG. 1 is a plan view of a portion of a typical structure of a straight trench drain embodying the present invention.
Figure 4:
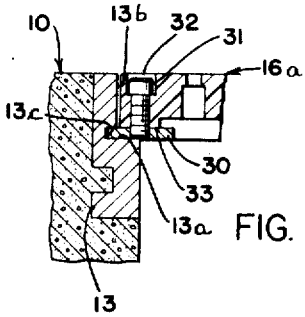
FIG. 4 is an enlarged fragmentary vertical sectional view of a locking grate taken as indicated by lines 4—4 in FIG. 1.
Figure 5:
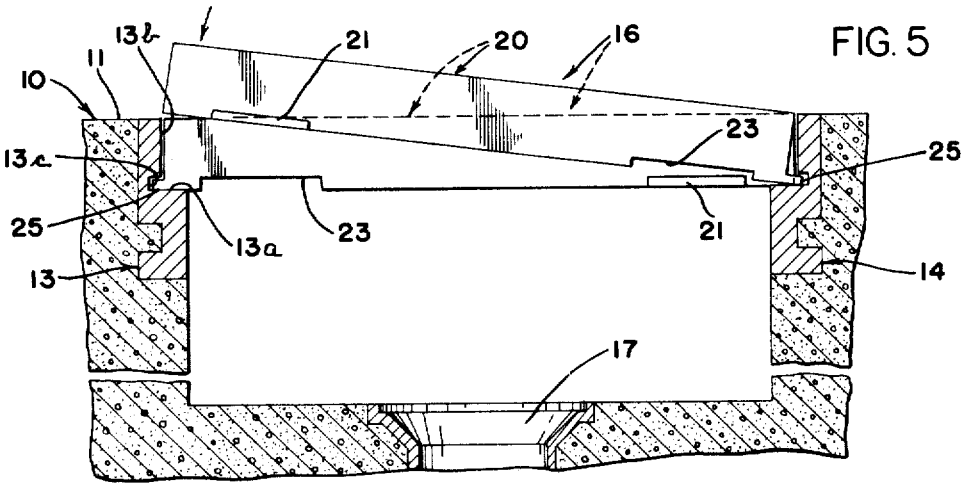
FIG. 5 is a vertical section through the system showing the manner of insertion of a grate member.

FIG. 1 of the drawings shows in plan a straight drainage trench arrangement in a concrete matrix or slab structure 10 for conducting water from the generally horizontal slab surface level 11 to one or more drainage outlets 17 (see FIG. 5). Opposed parallel like framing elements 13, 14 (see FIGS. 1 and 4) embedded at the trench edges, that is, in the concrete at the junction of the top surface area 11 and the vertical walls of the drainage trench itself, support a series of adjacent grates 16, 16a in contiguous relation as top closure elements for the drainage trench. Where, as shown in FIG. 1, the trench is not a closed curve, the grating members at each end of the series are also supported laterally by respective frame elements 12, 15 in shape identical with 13 or 14.

The framing elements 12, 13, 14, 15 are formed of identical stock in stainless steel, brass, or other material suitable for the environment of use and preferably which may be extruded to the cross section appearing in FIG. 4 for element 13. These are anchored in the surrounding concrete matrix structure by any of the various suitable expedients known to the prior art. Each framing has a longitudinal rabbet-like formation disposed inwardly toward the trench, providing a horizontal longitudinal shoulder 13a, a vertical longitudinal shoulder or surface 13b; and between the horizontal and vertical surfaces 13a, 13b, a longitudinal groove 13c (see FIG. 4) with one wall a continuation of the shoulder 13a.

Figure 2:
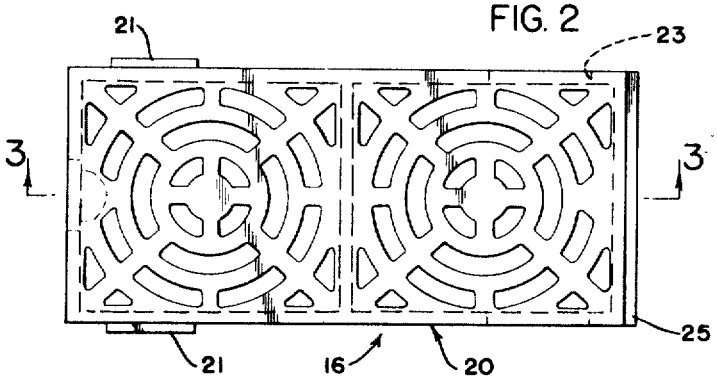
FIG. 2 is a detail plan view of a typical grating member.
Figure 3:
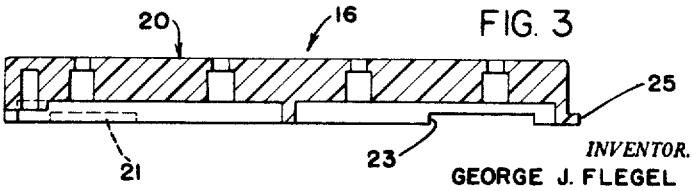
FIG. 3 is a generally central vertical longitudinal section of a grate taken as indicated by the lines 3—3 in FIGS. 1 and 2.

The grates 16 as designated in FIG. 1 (including the members 16a hereinafter described) are individually supported at opposite ends upon the continuous longitudinal shoulders of the framing elements 13, 14; and also have with respect to each other on adjacent sides an interlocking relation as will be described. The grates 16 (also 16a) as here shown all have a generally identical longitudinally symmetrical outline form which in top plan view is shown by FIG. 2 and in central longitudinal section in FIG. 3.

Except corner elements, where such are to be desired for a drainage trench continued around a curve or a corner, each grating element 16 comprises a generally rectangular body 20 apertured or perforated to provide drainage openings therethrough. On each side, similarly spaced from respective ends each grate 16 is provided with a lateral lug and correspondingly shaped notch so located that, with two adjacent grates reversed in orientation, the grooves and notches can interlock. Although the notches on one grate could be roughly diagonally located to each other, and so the lugs, here oppositely extending lateral lugs 21, downwardly spaced from the top surface, are located near one end of the body and near the other end are correspondingly located and shaped opposite notches or grooves 23 on the bottom side of lateral edge flanges. Equally well, here adjacent like grate elements oriented into end-to-end inverted relation are adapted to an interlocking engagement of the lateral lugs 21 on one in the notches or grooves 23 of the other. At the grating end adjacent the notches 23, a transverse tongue or flange 25 is provided for engagement in a frame groove as 13a with like thickness to lugs 21, all slightly smaller than the height of groove 13a.

The endwise projecting tongues 25 have an endwise tongue-and-groove interlocked relation with the groove formations alternately of the frame elements 13, 14. At the ends of the trench in an arrangement according to FIG. 1, the lateral lug 21 of each end-most grating is received in a groove and is laterally supported in a shoulder of the frame elements 12, 15 corresponding to the groove 13c and shoulder 13a as shown in FIG. 4 for element 13.

Grate structure attaining a similar interlock is hereinafter described with respect to FIG. 7 for curved trenches.

The length of the trench between the vertical shoulders of the end framing elements 12, 15 is, of course, substantially equal to a multiple of the body width of the units 16 (and 16a), that is, excluding the projecting dimension of the lugs 21; while the spacing between vertical shoulders of 13, 14 is slightly greater than the grate body length to permit insertion as later described.

A locking grate element or member 16a is disposed at any position between two elements 16, both of which have a fixed location, for example, as shown in FIG. 1, in consequence of engagement of opposite end members in the series with end frame members secured in the surrounding concrete matrix structure. Such a member 16a is interlocked at both ends, and hence serves either by itself or with others as a "key" or "keys" for the entire drain. It is to be understood that, for example, with a five to six inch wide trench and the grating element proportions of FIG. 2 for plastic units as hereinafter described, a locking grating is preferably located at about every ten feet of trench length.

A locking unit 16a in general form is identical to that heretofore described and shown in the drawings for grating units 16, lacking, however, the lateral lugs 21. Moreover, centrally located at the end opposite the tongue or flange 25, there are formations in the body to accommodate a lock device. This device includes a plate 30, threadedly engaged by a screw 31, received in a correspondingly shaped vertical central aperture 32 in the grating. The plate 30 is accommodated in a bottom notch 33 of the grate and engaged endwise in a frame slot such as 13c (see FIG. 4). Here the screw 31 is disclosed as a socket head cap screw adapted to manipulation from the top surface by an Allen wrench or the like.

In a straight trench structure shown in the drawings, the grating members 16 are filled in from each end of the trench, until a single space is left for a locking grate member. Each member is placed, as indicated in FIG. 5 by endwise insertion of its end tongue 25 at one end into the receiving groove of a frame member. The member is then dropped to bring its other end into bearing relation on the frame shoulder (as 13c in FIG. 4 or 5) on the opposite frame member, and moved laterally to bring its lug 21 into engagement with an end frame or lug 21 and notch 23 on one side into interlocking relation with an already positioned grating member.

Finally at a space remaining for a locking grate, a plate 30 is centrally located in an appropriate longitudinal groove of a member 13 or 14; the locking grate 16a is inserted and lowered directly into place for interlock of its notches 23 over adjacent lugs; and through an aperture 32, in the end of the locking grating member opposite the end with tongue 25, a screw 31 is threadedly engaged with the plate 30 and tightened up to lock up the entire assembly.

Figure 6:
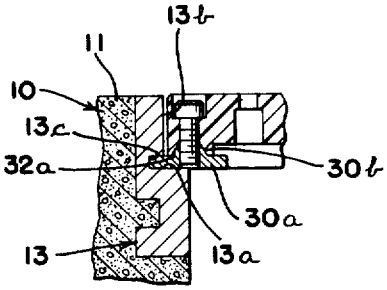
FIG. 6 is a view corresponding to FIG. 4 for a modification of the locking device and associated grate member; [and]

For convenience in the engaging of the screw 31 with its respective plate, the screw receiving bore and the plate may be modified as shown in FIG. 6, where the locking screw receiving plate 30a is provided with an upward conical boss 30b surrounding its threaded aperture, and a correspondingly shaped female taper 32a leads into the bottom of the screw aperture bore 32 of the locking grate. This arangement furthers the finding of a threaded engagement of the locking screw and plate by the "piloting" action of the boss and formations.

Where two trenches meet or intersect in a strictly right angle corner where the end of at least the inside framing element of one abuts the inside framing element of the other, the latter inside framing element may have at least locally similar shoulder and groove formations on both sides; so that the doubly shouldered inside frame of one trench may serve as an end frame in which is laterally engaged the last grate of the other trench.

Figure 7:
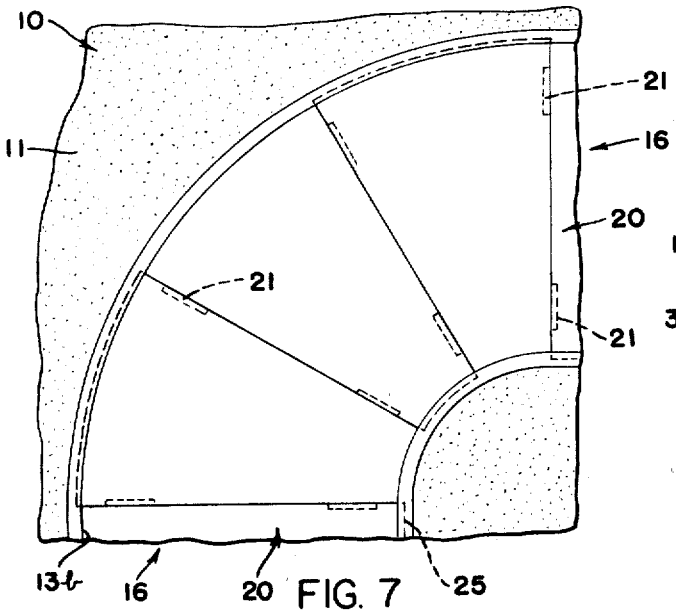
FIG. 7 is a plan view of curved grate members and framing for a curved portion of the drain, as at a rounder corner between two trenches[.]*; and*

In FIG. 7 there is shown the configuration of structure which may be used at a curved or corner region of a drainage trench. The grate supporting frame elements, similar to elements 13, 14 are of course appropriately curved and spaced; while the grates assume generally sectorial outline forms. However, in contrast to the grates shown for a straight trench where lateral interlock formations occur at identical location (lugs 21 absent in 16a) at least two distinct sectorial forms are required, which, though similar in general outline, have lips analogous to lips 25, lugs analogous to lugs 21 and notches analogous to notches 23 alternately at opposed ends of successive sectional elements. Alternatively, the curve grates could be identical, insofar as lug and notch locations are concerned, where lugs on opposite sides are "diagonally" located from each other, and so the grooves; but then where an adjacent straight trench works or fills from one into another curve, the straight length would have to be selected so that the last straight grate would be properly oriented.

Further should it be noted that the grating structure above described is of particular advantage where the grating elements 16, 16a are fabricated of synthetic plastic materials such as Du Pont's light-stabilized acetal type resin "Delrin"; or for non-combustibility, and where its degree of water absorption is not detrimental, of "Nylon." "Delrin" has appeared thus far particularly advantageous by virtue of its surface smoothness in molded forms, adaptability to coloring, non-corrodibility in general use, its lack of appreciable cold flow, and its thus far seeming characteristic of being a substance to which slime and generally bacterial growths are non-adherent.

Where the grating members may be rotated end for end in the body plane to provide the interlock relation, as in 16 (or 16a) for example, all may be made from the same basic mold cavity, with inserts used in molding 16a to fill mold spaces forming lugs 21. Likewise all members *could* [coud] have a notch 33; or an insert, used to form the same in 16a, could be removed in molding 16. The aperture 32 can be drilled; or an insert used in a common mold cavity to form the same. Even where cast metal grates are used, analogous procedures may be used in permanent mold casting, or the known procedures for like results with common basic patterns for sand molding.

Because of practical difficulties in obtaining exactly a trench of any given length with preferably a positive tolerance only in trench length, conveniently *locking* filler bars are also used in the system [;]. *Such a bar member, shown in FIG. 8, has* say ⅛ inch [in] width, [having] locking projections *25a,* such as *the one end projection* 25 in FIG. *1, 2, 3* or *5,* at both ends [,]; a long upwardly convergent slot *26* close enough to each respective end to permit inward deflection of the corresponding locking projection *25a;* and the bottom recessed *at 27,* to the depth of groove 23 *of the grate members represented* in FIG. [1] *3 and FIG. 5,* for the entire length between the slots, *to accomodate therebeneath lateral lugs 21 of adjacent grate members.* Such bars as needed each may be snapped into locking relation between two adjacent grates already in place with the frame grooves *13c* engaged by the projections *25a,* as permitted by the deflectability of the latter; *each filler bar member, thus end-locked, when overlaying the lateral lugs of adjacent grate members locking the adjacent grate members in position against lifting; but even apart from end engagement, such thin bar or bars being not easily removed, having a locking member function for the associated grate members precisely by serving as filler means keeping grate members from such displacement along the frame elements as would allow any grate member to escape a lug interlock with at least one laterally adjacent structure.*

What is claimed is:

1. In a framing and grating system in a drainage trench: framing elements of like cross section anchored in opposite edges of the drainage trench; a series of grate members closing the top of said trench and each supported at its opposite ends on upwardly exposed shoulder formations of said elements; adjacent said members having interlocking lateral lug and notch formations providing on each side of a member a first portion adapted to be overlain by a portion of the adjacent member and a second portion adapted to overlay another portion of the same adjacent member, excepting a locking member in said series devoid of said lug formations; each of said elements having a longitudinal rabbet formation providing a respective said shoulder formation and also having a longitudinal groove parallel to, and laterally opening toward the trench above, said shoulder; each of said members having solely at one end an integral [propection] *projection* engaged in a tongue-and-groove relation with a said groove of one of said elements; said locking grate member having at an end opposite its said projection releasable locking means engaged with, and in the said groove of, an adjacent one of said elements; and means engaging a respecive member laterally at each end of the series to prevent movement parallel to the trench away from the next member of the series.

2. In a drain trench formed in a concrete slab or the like; trench framing elements of identical cross section anchored in the edges of the trench and a series of laterally abutting grating members each supported at its opposite ends on respective frame elements; each framing element having on the upper side thereof a longitudinal rabbeted formation facing the trench providing a horizontal longitudinal shoulder supporting an end of a grating member, and also having in said rabbeted formation a longitudinal groove open toward the trench; each grating member having solely at one end an integral tongue projection in engagement in a said groove of one of said elements; said grating members each having on adjacent longitudinal edges interlocking laterally projecting integral lugs and laterally open notch formations providing on each side of a member a first portion adapted to be overlain by a portion of the adjacent member and a second portion adapted to overlay another portion of the same adjacent member, excepting a locking grating member in said series devoid of said lugs; said locking member including at its end opposite said tongue a lock plate engaged in a said groove of a said frame element, and a vertically disposed lock screw through said locking member threadedly engaged in said plate and accessible from the top of said locking member to a driving tool, whereby said locking member is secured at its opposite ends in respective frame elements; and means fixed to the slab engaging a respective member laterally at each end of said series preventing movement away from the next member of the series.

3. In the locking arrangement as described in claim 2, said plate having an upwardly projecting locating boss surrounding the threaded aperture thereof; and the bottom of said aperture in said locking grating member being formed to receive said boss.

4. In a framing and grating system in a drain trench: longitudinal framing elements and transverse end framing elements of like cross section anchored in coplanar relation in edges of the drainage trench; a series of grating members closing the top of said trench and each supported at opposite ends on shoulder formations of longitudinal elements; adjacent said members having interlocking lateral lug and laterally and downwardly open notch formations excepting a locking member in said series devoid of said lug formations; each of said elements having a longitudinal groove parallel to and laterally open toward the trench above said shoulder and each of said members having solely at one end an integral projection engaged in a tongue-and-groove relation with a said groove of a said longitudinal element; successive members having their said projections engaged alternatingly in longitudinal elements on opposite sides of the trench; and in said series a said locking grate member having at an end opposite said projection an underlying projecting locking plate engaged in a said groove of an adjacent one of said elements and having a lock screw through the locking grate member threadedly engaged in said plate.

5. A system as described in claim 4 wherein opposite end members of said series have a lateral edge supported on a said shoulder and a lateral lug engaged in a said groove of respective trench end framing elements.

6. A system as described in claim 4 including in at least a portion thereof a series of identical grating members of rectangular body configuration with adjacent members in end-to-end reversed orientation, each grating member having the lugs and notches disposed with a lug and notch on each lateral edge equi-spaced from respective ends of the member.

7. A grate member for a drainage trench with framing members anchored in the trench edges as described in claim 1, said notches and lugs being so mutually located that the same orientation thereof is retained upon turning the member end for end in its plane.

8. The member as described in claim 7, wherein the notches are located near one end of the body and the lugs near the other end.

*9. In a framing and grating system in a drainage trench: framing elements of like cross section anchored in opposite side edges of the drainage trench; a series of like grate members spanning the top of said trench and each supported at its opposite ends on upwardly exposed shoulder formations of said elements; adjacent said members having longitudinal sides with longitudinally continuous vertical upper margins whereby abutting sides of adjacent grate members display a straight line of abut-*

*ment, and adjacent said members having along lower side margins interlocking lateral lug and notch formations providing on each side of a member a first lug portion adapted to be overlain by a notched side portion of an adjacent like member in end-for-end reversed orientation and a second notched portion adapted to overlay a lug portion of the same adjacent member; each of said elements having a longitudinal rabbet formation providing a respective said shoulder formation and also having a longitudinal groove parallel to said shoulder and laterally opening toward the trench above said shoulder; each of said members having solely at one end an integral projection engaged in a tongue-and-groove relation with a said groove of one of said elements; locking means including a bar member devoid of lateral lugs between a pair of adjacent grate members and having opposite ends supported on respective said shoulder formations and having the portion intermediate its said ends recessed to accommodate projecting lugs of any adjacent grate member; and means engaging a respective member laterally at each end of the series to prevent movement parallel to the trench length away from the next member of the series with the said members held in successively abutting relation.*

*10. In a drain trench formed in a concrete slab or the like; trench framing elements of identical cross section anchored in the side edges of the trench and a series of laterally abutting grating and locking members each supported by its opposite ends bearing on respective frame elements and having longitudinally continuous vertical upper side margins whereby abutting sides of adjacent members upwardly display a straight line of abutment; each framing element having on the upper side thereof a longitudinal rabbeted formation facing the trench providing a horizontal longitudinal shoulder supporting corresponding ends of the said members resting thereon and also having in said rabbeted formation a longitudinal groove open toward the trench; each grating member having solely at one end an integral tongue projection in engagement in a said groove of said elements; successive said projections engaged in a said groove alternately on opposite sides of the trench; said grating members each having on adjacent longitudinal sides and spaced downwardly from the top interlocking laterally projecting integral lugs and laterally open notch formations providing on each side of a grating member a first portion adapted to be overlain by a portion of the adjacent member and a second portion adapted to overlay another portion of the same adjacent member, said members being disposed in end-for-end reversed relation; locking means including a thin filler bar devoid of lateral lugs with opposite ends supported on said shoulders interposed between adjacent said members, said filler bar having the portion intermediate its said ends recessed to accommodate projecting lugs of any adjacent member, and a said locking member in said series comprising a grating type member including at one end a tongue projection in engagement with a said groove of one of said elements and at its end opposite said tongue a lock plate with a projection engaged in a said groove of the other said frame element, and a vertically disposed lock screw through said locking member threadedly engaged in said plate and accessible from the top of said locking member to a driving tool, whereby said locking member is secured at its opposite ends in respective frame elements.*

*11. In a framing and grating system in a drain trench: longitudinal framing elements and transverse end framing elements of like cross section anchored in coplanar relation in edges of the drainage trench; a set of grating members spanning the top of said trench and each supported by its opposite ends bearing on shoulder formations of longitudinal elements; adjacent said grating members having interlocking lateral lug and laterally and downwardly open notch formations; each of said elements having a longitudinal groove parallel to and laterally open toward the trench above said shoulder and each of said members having solely at one end an integral projection engaged in a tongue-and-groove relation with a said groove of a said longitudinal element; successive grating members having their said projections engaged alternatingly in longitudinal elements on opposite sides of the trench; a further grating member with opposite ends supported on said shoulder formations, and having on one end a projection engaged in tongue-and-groove relation with the said groove of one element and having at an end opposite its said projection an underlying projecting locking plate engaged in a said groove of the other one of said elements, said further grating member having means securing said plate thereto and releasably with respect to its groove engagement; and a filler member interposed with said grating members between said transverse end framing elements, said filler member narrower than a said grating member, and with said grating members filling the distance between said transverse end frame elements to prevent shifting of grating members along said trench out of interlocking relation.*

*12. In a framing and grating system in a drain trench: longitudinal framing elements and transverse end framing elements of like cross section anchored in coplanar relation in edges of the drainage trench; a series of grating members spanning the top of said trench and each supported at opposite ends on shoulder formations of longitudinal elements; adjacent said grating members having interlocking lateral lug and laterally and downwardly open notch formations; each of said elements having a longitudinal groove parallel to and lateraly open toward the trench above said shoulder and each of said members having solely at one end an integral projection engaged in a tongue-and-groove relation with a said groove of a said longitudinal element; successive grating members having their said projections engaged alternatingly in longitudinal elements on opposite sides of the trench; and at least one member devoid of lateral lugs with opposite ends supported on respective said shoulders and interposed with said series between said transverse end framing elements, the last said member insertable as a last component with said grating members filling the distance between said transverse end frame elements to prevent shifting of grating members along said trench out of interlocking relation.*

*13. In a framing and grating system in a draingage trench: framing elements of like cross section anchored in opposite side edges of the drainage trench; each of said elements having a longitudinal rabbet formation providing a respective upwardly exposed shoulder formation and also having a longitudinal groove parallel to, and laterally opening toward the trench above, said shoulder; means spanning said elements providing spaced abutments; a series of similar grate members spanning the top of said trench between said abutments and each supported by its opposite ends bearing on respective said upwardly exposed shoulder formations of said elements; said members having longitudinal sides with longitudinally continuous vertical upper margins whereby abutting sides of adjacent grate members upwardly display a straight line of abutment, and adjacent said members having along lower side margins interlocking lateral lug and notch formations providing on each side of a member a first portion overlain by a side portion of the adjacent member and a second portion overlaying another portion of the same adjacent member; said members each having solely at one end an integral projection with successive members having their said projections engaged in a tongue-and-groove relation alternatingly with the said groove of respective said elements; and locking means with said series filling the area between said abutments, to hold said grate members in lateral interlocking substantially abutting relation, said locking means including a bar member devoid of lateral lugs having opposite ends supported on respective said shoulder formations and insertable from above said frame*

*elements and of form impeding ready non-instrumental removal from the system.*

References Cited

The following references, cited by the Examiner, are of record in the patented file of this patent or the original patent.

UNITED STATES PATENTS

| | | | |
|---|---|---|---|
| 250,210 | 11/1881 | Culver | 126—211 |
| 557,786 | 4/1896 | Ensign | 94—31.1 |
| 1,334,222 | 3/1920 | Butler | 20—8 |
| 1,384,712 | 7/1921 | Shanley | 94—35 |

| | | | |
|---|---|---|---|
| 1,721,464 | 7/1929 | Myers | 94—13 |
| 2,159,752 | 5/1939 | Shaw | 94—31.3 |
| 2,436,593 | 2/1948 | Moselowitz | 94—31.1 |

FOREIGN PATENTS

| | | |
|---|---|---|
| 164,630 | 4/1949 | Austria. |
| 650 | 3/1858 | Great Britain. |
| 10,551 | 6/1891 | Great Britain. |
| 23,575 | 12/1894 | Great Britain. |
| 25,846 | 12/1901 | Great Britain. |
| 477,124 | 12/1937 | Great Britain. |

JACOB L. NACKENOFF, *Primary Examiner.*